United States Patent
McConnell et al.

[15] 3,673,207
[45] June 27, 1972

[54] OXAZOLIDINE-3-OXYL DERIVATIVES

[72] Inventors: Harden M. McConnell, Stanford; Edwin F. Ullman, Atherton, both of Calif.

[73] Assignee: Synvar Associates, Palo Alto, Calif.

[22] Filed: April 17, 1970

[21] Appl. No.: 29,662

[52] U.S. Cl. ..............................260/307 F, 23/230, 252/408
[51] Int. Cl. ............................................C07d 85/26
[58] Field of Search ...............................260/307 F

[56] References Cited

OTHER PUBLICATIONS

Keana et al., J. Am. Chem. Soc. 89, 3055– 3056 (1967)

*Primary Examiner*—Alex Mazel
*Assistant Examiner*—R. V. Rush
*Attorney*—Townsend and Townsend

[57] ABSTRACT

Novel oxazolidine-3-oxyl compounds, wherein the two-carbon of the oxazolidine is a carbon in the chain of oleic acid, which are useful as spin labels for biological membranes, are prepared by reaction of a 2-amino-2-lower alkyl-alkanol with an oxooleic acid, the resulting product oxidized to the corresponding oxazolidine-3-oxyl.

5 Claims, No Drawings

OXAZOLIDINE-3-OXYL DERIVATIVES

This invention is directed to novel oxazolidine compounds. More particularly, this invention is directed to novel oxazolidine-3-oxyl compounds which contain diorgano substitution at the $C_2$ position.

Specifically, the novel compounds of this invention are represented by the following formula:

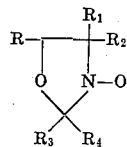

wherein: R is hydrogen or lower alkyl, $R_1$ and $R_2$ are each a lower alkyl, $R_3$ is (a) $CH_3(CH_2)_m-$ where $m$ is 0–5, or (b)

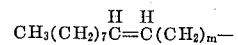

where $m$ is 2–4, and $R_4$ is (a)

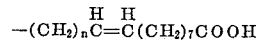

where $n$ is 1–6, or (b) $-(CH_2)_n COOH$ where $n$ is 2–4. Specifically, when $R_3$ is $CH_3(CH_2)_m-$, $R_4$ is

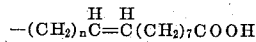

Similarly, when $R_3$ is

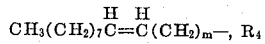

is $-(CH_2)_n COOH$.

The total number of carbon atoms $m+n$ is 6, i.e., the total number of carbon atoms contained in groups $R_3$ and $R_4$ is 17.

The compounds of this invention may alternatively be characterized as labeled oleic acids, the acid substituted at one of the $C_4$–$C_6$ or $C_{12}$–$C_{17}$ methylene groups with an oxazolidine-3-oxyl. The carbon of the substituted methylene group forms part of, and is bonded to the nitrogen and oxygen atoms of the oxazolidine ring as illustrated below for a $C_{18}$ substituted oleic acid in which R is hydrogen.

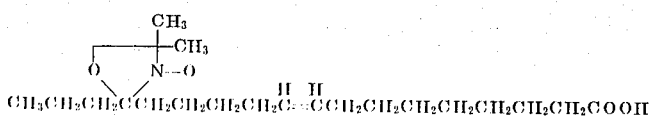

The oxazolidine may be positioned at any one of the $C_4$–$C_6$ or $C_{12}$–$C_{17}$ carbon atoms. Depending upon the positioning of the oxazolidine relative to the oleic acid double bond, the organic group to the left of the substituted carbon can be defined by either $R_3(a)$ or $R_3(b)$. Similarly, the organic group to the right of the substituted carbon atom can be defined by either $R_4(a)$ or $R_4(b)$. In the above illustration, the organic group to the left of the substituted carbon corresponds to $R_3(a)$, the organic group to the right of the substituted carbon to $R_4(a)$.

The compounds of this invention are useful as spin labels for biological membranes. The labeling process entails immersion of the membrane containing material (for example, nerve fibers, erythrocytes, etc.) in a buffer containing one of the above radical The ESR spectrum of the membrane demonstrates incorporation of the label. Changes in the membrane structure resulting from a biochemical change will be reflected in a change in the ESR spectrum. Such novel compositions are especially useful for example, for determining the structure and properties of membranes, and the nature of chemical and physical processes involving same. A more complete discussion of spin label ESR techniques appears in U.S. Application Ser. No. 496,622, now U.S. Pat. No. 3,489,522, and incorporated herein by a reference.

The compounds of the present invention may be prepared from the corresponding oxooleic acids by the general technique described by Keana et al., Journal American Chemical Society, 89,3055 (1967), incorporated herein by reference. By this method, a 2-amino-2-lower alkyl-lower alkanol is condensed with an oxooleic acid (a ketone) to give an oxazolidine which is subsequently oxidized with m-chloroperbenzoic acid to the nitroxide radical. The reaction, illustrated for 2-amino-2-methyl propanol, proceeds in the manner as shown below:

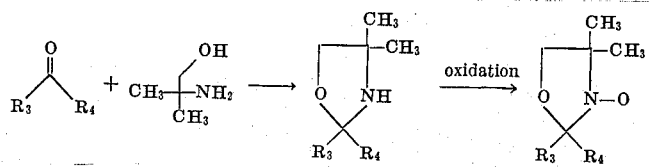

The reaction of oxooleic acid and amino alcohol is carried out in an organic solvent which is immiscible with water. Such solvents include benzene, cyclohexane, tetrahydrofuran, ether, chloroform, etc. The reaction is carried out in the presence of a catalytic amount of a strong acid such as $H_2SO_4$, p-toluene sulfonic acid, hydrochloric acid, and the like The reaction temperature may vary from 50°–160° and depending upon the particular temperature selected, the time of reaction will vary from 1–48 hours. After reaction, water is separated by use of a drying agent or by distillation.

Suitable 2-amino-2-alkyl alkanols in the above reaction include 2-amino-2-methyl butanol, 2-amino-2-methyl propanol 2-amino-2-ethyl butanol, and the like. Also suitable are amino alcohols of the general formula:

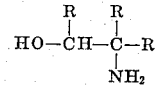

where R is a lower alkyl and may be the same or different. For example, each of the R's may represent a methyl group. Using an amino alkanol of this type of structure provides an oxazolidine-3-oxyl compound of this invention in which R of the general formula given above is a lower alkyl group.

Other suitable oxidizing agents in the oxazolidine oxidation include hydrogen peroxide with either sodium tungstate or phosphotungstic acid catalyst. In general, any oxidizing agent can be used which can supply an oxygen atom. The oxidation reaction proceeds satisfactorily at room temperature and may take from less than a minute to several hours.

In essence, in the process employed in this invention, an oxo substituted oleic acid is reacted with a 2-amino-2-lower alkyl-lower alkanol. The alkanol reacts with the acid through the oxo group, thereby forming an oxazolidine ring in which the oxo carbon atom of the oleic acid is incorporated into the ring. The resulting product is then oxidized in the presence of a suitable oxidizing agent to form the 3-oxyl derivative.

The point of oxazolidine ring attachment is determined by the positioning of the oxo group, this dependence reflected in the alternative definitions of $R_3$ and $R_4$. To prepare any of the oxazolidine-3-oxyl derivatives within the scope of this invention, it is first necessary to prepare an appropriately substituted oxooleic acid. The positioning of the oxo group can accordingly be regulated by selection of reactants used, and the nature of the reaction sequence chosen in the preparation of the acid. The oxooleic acids used in this invention can be characterized as belonging to one of two groups as set forth below, the groups differing only in the relationship of the unsaturated bond to the oxo radical.

$$CH_3(CH_2)_m\overset{O}{\underset{\|}{C}}(CH_2)_n\overset{H}{C}=\overset{H}{C}(CH_2)_7COOH \qquad (I)$$
(cis)

$$CH_3(CH_2)_7\overset{H}{C}=\overset{H}{C}(CH_2)_m\overset{O}{\underset{\|}{C}}(CH_2)_nCOOH \qquad (II)$$

wherein $m$ is from 0 to 5, $n$ from 1 to 6, and $m+n=6$ in formula I; and $m$ is from 2 to 4, $n$ from 2 to 4 and $m+n=6$ in formula II.

A different set of reactions is required for each group. The preparation of these acids is set out in the following flow diagram.

Reaction sequence for preparation of oxooleic acids of formula I.

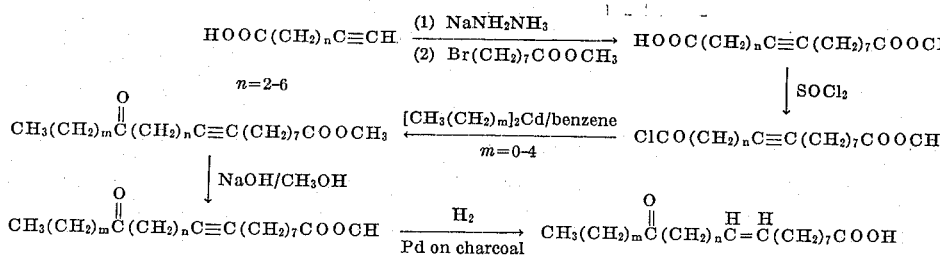

Reaction sequence for preparation of oxooleic acids of Formula II

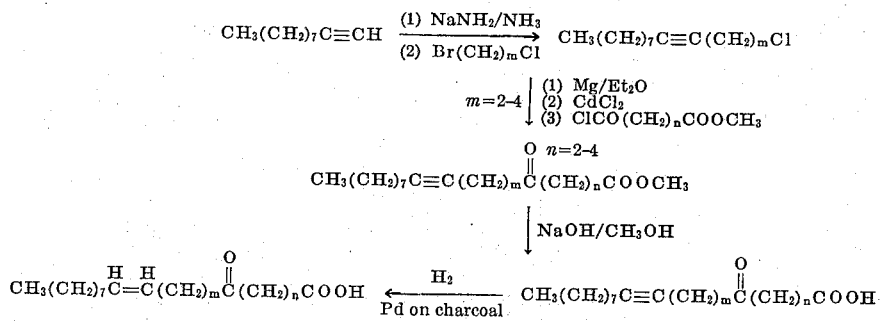

In the above reaction sequences the last two steps may be reversed. That is, the reduction of the triple bond of the acetylenic ester may proceed the hydrolysis step. It is also possible to postpone the hydrolysis step until after the introduction of the oxazolidine and its oxidation to a nitroxide radical.

It should be noted that the above general reaction scheme is not applicable to the preparation of the ketones of formula I wherein $m=5$ and $n=1$. Such ketones are prepared by a chromic acid oxidation of ricinoleic acid (12-hydroxyoleic acid) to 12-oxooleic acid according to the procedure of Nichols et al., Journal of the American Chemical Society, 80, 5705 (1958), incorporated herein by reference.

An alternative procedure for the preparation of the ketones of general formula I ($m=0$, $n=6$) entails oxidation of 17-hydroxyoleic acid, a fermentation product isolated by Gorin et al., Canadian Journal of Chemistry, 39, 846 (1961) and incorporated herein by reference. Oxidation by the method of Nichols et al. gives 17-oxooleic acid which is converted to the oxazolidine radical as indicated above.

The $C_5$–$C_9$ alkynoic acid starting materials in the preparation of the oxooleic acids of formula I are commercially available, and may also be prepared by well-known techniques. The 1-decyne starting material in the preparation of the oxooleic acids of formula II is similarly available.

The reactions depicted in the above-illustrated reaction sequences are all standard reactions, e.g., the substitution of —OH with —Cl by reaction with thionyl chloride. The suitable reaction conditions employed herein fall within the general conditions for these standard reactions. It should be appreciated that there is no real criticality in the process conditions. A wide range of conditions is possible. The preferred conditions for a given reaction can easily be determined by routine experimentation. Those reported in the illustrated preparations are typical. The reactants will generally be added in equimolar proportions. However, one reactant may be added in excess to insure complete conversion. It is to be noted that when using cadmium chloride, it is necessary to employ only one-half mole, i.e., one equivalent. Further, sodium hydroxide should always be added in excess. In the reduction of the octadecynoic acid, not more than 1 equivalent of hydrogen should be added, for further addition will result in saturation of the double bond.

Thus having described the invention, the following non-limiting examples are presented by way of illustration.

EXAMPLE 1

I. Preparation of 13-oxooleic acid
a. 12-Carbomethoxy-4-dodecynoic acid chloride $$\overset{O}{\underset{\|}{ClC}}(CH_2)_2C\equiv C(CH_2)_7COOCH_3$$

To 1 l. of liquid ammonia is added 20 moles of sodium and a crystal of ferrous sulfate. After the blue color disappears 10 mmoles of 4-pentynoic acid is added and the solution stirred for 30 minutes. Methyl ω-bromooctanoate (10m mole) in 50 ml of ether is then added dropwise over 15 minutes and stirring continued for an additional 2 hours. The solvent is then allowed to evaporate and the residue is taken up in dilute acid and extracted promptly with chloroform. Evaporation of the solvent yields 12-carbomethoxy-4-dodecynoic acid which is purified by recrystallization from methanol. This product is boiled with 100 ml of thionyl chloride for 30 minutes, and the reagent is then removed in vacuo to yield the crude acid chloride.

(b) 13-oxo-9-octadecynoic acid $$CH_3(CH_2)_4\overset{O}{\underset{\|}{C}}(CH_2)_2C\equiv C(CH_2)_7COOH$$

To the crude acid chloride obtained in the preceding experiment dissolved in 500 ml of dry benzene is added dropwise over 30 minutes a solution of 1 equiv. of dipentyl cadmium in 200 ml benzene which has previously been prepared from ethereal 1-pentylmagnesium bromide by the addition of 0.5 equivalent of cadmium chloride. After the addition is complete, the mixture is stirred at room temperature for one hour followed by warming to reflux for 15 minutes. The mixture is then cooled and extracted successively with aqueous sodium carbonate, hydrochloric acid and water. The solvent is evaporated in vacuo, excess methanolic sodium hydroxide added, and the solution allowed to reflux for 15 minutes. It is then poured into water and extracted several times with ether. The aqueous solution is then acidified with hydrochloric acid and the product isolated by extraction with ether and evaporation of the extracts.

(c)              13-oxooleic acid

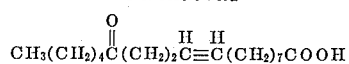

$$CH_3(CH_2)_4\overset{O}{\overset{\|}{C}}(CH_2)_2\overset{H}{C}=\overset{H}{C}(CH_2)_7COOH$$

The acid obtained in the preceding experiment is dissolved in ether and stirred under a hydrogen atmosphere with a catalytic amount of 5 percent palladium on charcoal. After the uptake of one equivalent of hydrogen, the catalyst is removed by filtration and the solution evaporated to dryness. The product is crystallized from petroleum ether.

II. Preparation of cis-2(11-carboxy-3-undecenyl)-2-pentyl-4,4-dimethyl-oxazolidine-3-oxyl

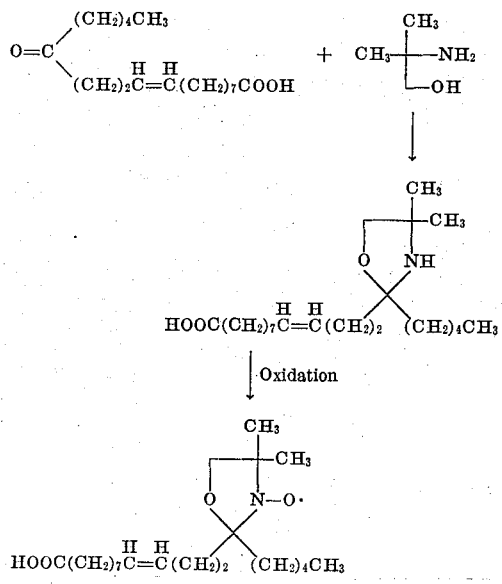

To a solution of the above obtained 13-oxooleic acid in 50 ml of benzene is added excess 2-amino-2-methyl-propan-1-ox and a trace of p-toluene sulfonic acid. The solution is heated at reflux and the water removed with a water separator. The solution is then cooled and washed several times with water, dried over sodium sulfate, and evaporated to dryness in vacuo. The oxazolidine residue is taken up in ether and the resulting solution cooled in an ice bath. To this stirred solution is added dropwise over 20 minutes 1.5 equiv. of m-chloroperbenzoic acid. The mixture is then allowed to warm to room temperature. After standing for 24 hours the solution is washed with just enough cold 5 percent sodium bicarbonate to remove the m-chlorobenzoic acid. The organic solution is then evaporated to dryness and the oxazolidine-3-oxyl recrystallized from methanol.

EXAMPLE 2

Alternatively, oxidation of oxazolidine prepared following the procedure of Example 1, is achieved by stirring the oxazolidine in a 50 percent ethanol-water solution containing a 20-fold excess of hydrogen peroxide and a few crystals of sodium metatungstate. After stirring for 2 days at room temperature, sufficient sodium carbonate is added to render the solution basic and the mixture is washed several times with ether, adjusted to pH 4 with phosphoric acid and repeatedly extracted with ether. The extracts are dried and evaporated to give the product radical. The above procedure is again repeated, substituting phosphotungstic acid as the oxidation agent, and obtaining the oxazolidine-3-oxyl.

EXAMPLE 3

I. Preparation of 4-oxooleic acid
a. 1-Chloro-5-tetradecyne $CH_3(CH_2)_7C\equiv C(CH_2)_4Cl$ To 1 l. of liquid ammonia is added 10 mmoles of sodium and a crystal of ferrous sulfate. After the blue color disappears, 10 mmoles of 1-decyne is added and the solution is stirred for 30 minutes. 1-Bromo-4-chlorobutane (10 mmole) is then added dropwise over 15 minutes and stirring continued for an additional 2 hours. The solvent is then allowed to evaporate and the residue is partitioned between ether and water. The ether layer is dried and distilled to yield the chloroacetylene.

4-oxo-9-octadecynoic acid (b) 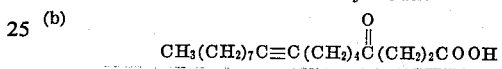

$$CH_3(CH_2)_7C\equiv C(CH_2)_4\overset{O}{\overset{\|}{C}}(CH_2)_2COOH$$

A solution of 1 equivalent of 1-chloro-5-tetradecyne in dry ether is stirred under nitrogen with 1 equivalent of magnesium metal. After nearly complete dissolution of the metal, 0.5 equivalents of dry cadmium chloride is added and the solution is evaporated to dryness in vacuo. Dry benzene is added to the residue, the resulting suspension filtered under nitrogen, and then added dropwise to a dry benzene solution of one equivalent of the acid chloride of monomethyl succinic acid ester. After the addition is complete (about 30 minutes), the mixture is stirred at room temperature for 1 hour followed by warming to reflux for 15 minutes. The mixture is then cooled and extracted successively with aqueous sodium carbonate, hydrochloric acid and water. The solvent is evaporated in vacuo and excess methanolic sodium hydroxide added. This solution is allowed to reflux for 15 minutes whereupon it is poured into water and extracted several times with ether. The aqueous solution is then acidified with hydrochloric acid and the product isolated by extraction with ether and evaporation of the extracts.

4-oxooleic acid (c) 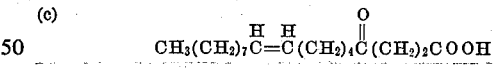

$$CH_3(CH_2)_7\overset{H}{C}=\overset{H}{C}(CH_2)_4\overset{O}{\overset{\|}{C}}(CH_2)_2COOH$$

The 4-oxo-9-octadecynoic acid obtained in the preceding experiment is dissolved in ether and stirred under a hydrogen atmosphere with a catalystic amount of 5 percent palladium on charcoal. After the uptake of one equivalent of hydrogen, the catalyst is removed by filtration and the solution evaporated to dryness. The residual product is crystallized from petroleum ether to obtain the named product. II. Preparation of cis-2-(2-carboxyethyl)-2-(5-tetradecenyl)-4,4-dimethyl-oxazolidine-3-oxyl

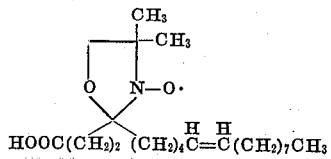

Following the procedure of Example 1, 4-oxooleic acid is reacted with 2-amino-2-methyl propanol, and the reaction product oxidized with m-chloroperbenzoic acid to yield the above named product.

EXAMPLE 4

Preparation of cis-2-(10-carboxy-2-decenyl)-2-hexyl-4,4-dimethyl-oxazolidine-3-oxyl

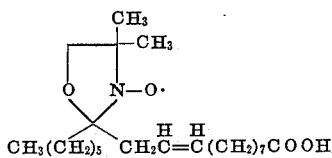

Following the procedure of Example 1, 12-oxooleic acid prepared by a chromic acid oxidation of ricinoleic acid is reacted with 2-amino-2-methyl propanol and the resulting reaction product oxidized with sodium metatungstate to yield the named product.

EXAMPLE 5

Preparation of cis-2(11-carboxy-3-undecenyl)-2-pentyl-4,4-diethyl-oxazolidine-3-oxyl

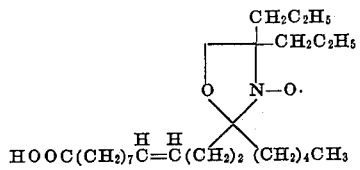

Following the method of Example 1, 13 - oxooleic acid is reacted with 2-amino-2-ethyl butanol, and the resulting product then oxidized with m-chlorobenzoic acid to yield the named product.

All of the foregoing invention has been described in some detail by way of illustration for the purposes of clarity and understanding. It will be apparent to one skilled in this art that certain changes and modifications may be practiced within the spirit of this invention as limited only by the scope of the appended claims.

What we claim is:

1. An oxazolidine-3-oxyl compound of the formula:

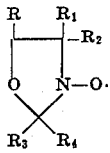

wherein R is hydrogen;

$R_3$ is (a) $CH_3(CH_2)_m-$, where $m$ is 0–5, or (b)

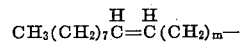

where $m$ is 2–4; and
$R_4$ is (a)

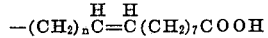

where
$n$ is 1–6 or (b) $-(CH_2)_nCOOH$ where $n$ is 2–4; subject to the limitation that when $R_3$ is $CH_3(CH_2)_m-$, $R_4$ is

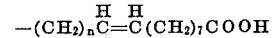

and when $R_3$ is

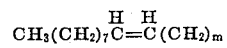

$R_4$ is $-(CH_2)_nCOOH$, and $m+n=6$ in all cases.

2. An oxazolidine-3-oxyl in accordance with claim 1 wherein $R_1$ and $R_2$ are each methyl.

3. The cis-2-(2-carboxyethyl)-2-(5-tetradecenyl)-oxazolidine-3-oxyl of claim 2 wherein $R_3$ is

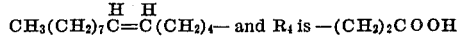

4. The cis-2-(10-carboxy-2-decenyl)-2-hexyl oxazolidine-3-oxyl of claim 2 wherein $R_3$ is

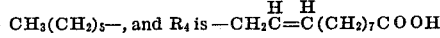

5. The cis-2-(11-carboxy-3-undecenyl)-2-pentyl oxazolidine-3-oxyl of claim 2 wherein $R_3$ is

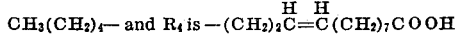

* * * * *

UNITED STATES PATENT OFFICE
CERTIFICATE OF CORRECTION

Patent No. 3,673,207      Dated June 27, 1972

Inventor(s) Harden M. McConnell et al.

It is certified that error appears in the above-identified patent and that said Letters Patent are hereby corrected as shown below:

The term of this patent subsequent to June 6, 1989, has been disclaimed.

Signed and sealed this 13th day of May 1975.

(SEAL)
Attest:

RUTH C. MASON
Attesting Officer

C. MARSHALL DANN
Commissioner of Patents
and Trademarks